US009600067B2

(12) United States Patent
Kumar et al.

(10) Patent No.: US 9,600,067 B2
(45) Date of Patent: Mar. 21, 2017

(54) SYSTEM AND METHOD FOR GENERATING A MIXED REALITY ENVIRONMENT

(75) Inventors: Rakesh Kumar, West Windsor, NJ (US); Targay Oskiper, East Windsor, NJ (US); Oleg Naroditsky, Princeton, NJ (US); Supun Samarasekera, Princeton, NJ (US); Zhiwei Zhu, Plainsboro, NJ (US); Janet Kim, Morrisville, PA (US)

(73) Assignee: SRI International, Menlo Park, CA (US)

( * ) Notice: Subject to any disclaimer, the term of this patent is extended or adjusted under 35 U.S.C. 154(b) by 1531 days.

(21) Appl. No.: 12/606,581

(22) Filed: Oct. 27, 2009

(65) Prior Publication Data
US 2010/0103196 A1    Apr. 29, 2010

Related U.S. Application Data

(60) Provisional application No. 61/108,714, filed on Oct. 27, 2008.

(51) Int. Cl.
G09G 5/00    (2006.01)
G06F 3/01    (2006.01)

(52) U.S. Cl.
CPC ..................................... *G06F 3/012* (2013.01)

(58) Field of Classification Search
None
See application file for complete search history.

(56) References Cited

U.S. PATENT DOCUMENTS

| 6,064,749 | A  | * | 5/2000 | Hirota et al. | 382/103 |
| 7,379,077 | B2 | * | 5/2008 | Bani-Hashemi et al. | 345/633 |
| 7,613,356 | B2 | * | 11/2009 | Uchiyama et al. | 382/271 |
| 7,774,044 | B2 | * | 8/2010 | Sauer et al. | 600/424 |
| 7,787,012 | B2 | * | 8/2010 | Scales et al. | 348/158 |
| 8,284,995 | B2 | * | 10/2012 | Diaz et al. | 382/104 |
| 2002/0094189 | A1 | * | 7/2002 | Navab et al. | 386/4 |
| 2004/0028258 | A1 | * | 2/2004 | Naimark et al. | 382/103 |
| 2004/0189675 | A1 | * | 9/2004 | Pretlove et al. | 345/633 |
| 2005/0068314 | A1 | * | 3/2005 | Aso et al. | 345/419 |

(Continued)

OTHER PUBLICATIONS

Oskiper et al., "Visual Odometry System Using Multiple Stereo Cameras and Inertial measurement Unit", 2007, IEEE.*

(Continued)

*Primary Examiner* — David H Chu
(74) *Attorney, Agent, or Firm* — Moser Taboada

(57) ABSTRACT

A system and method for generating a mixed-reality environment is provided. The system and method provides a user-worn sub-system communicatively connected to a synthetic object computer module. The user-worn sub-system may utilize a plurality of user-worn sensors to capture and process data regarding a user's pose and location. The synthetic object computer module may generate and provide to the user-worn sub-system synthetic objects based information defining a user's real world life scene or environment indicating a user's pose and location. The synthetic objects may then be rendered on a user-worn display, thereby inserting the synthetic objects into a user's field of view. Rendering the synthetic objects on the user-worn display creates the virtual effect for the user that the synthetic objects are present in the real world.

33 Claims, 3 Drawing Sheets

(56) References Cited

U.S. PATENT DOCUMENTS

| | | | |
|---|---|---|---|
| 2005/0231199 A1* | 10/2005 | Rajagopalan et al. | 324/309 |
| 2006/0028400 A1* | 2/2006 | Lapstun et al. | 345/8 |
| 2006/0073449 A1* | 4/2006 | Kumar et al. | 434/219 |
| 2006/0074549 A1* | 4/2006 | Takahashi et al. | 701/207 |
| 2007/0024644 A1* | 2/2007 | Bailey | 345/633 |
| 2007/0027591 A1* | 2/2007 | Goldenberg et al. | 701/23 |
| 2007/0279435 A1* | 12/2007 | Ng et al. | 345/624 |
| 2008/0243142 A1* | 10/2008 | Gildenberg | 606/130 |
| 2009/0036902 A1* | 2/2009 | DiMaio et al. | 606/130 |
| 2009/0167787 A1* | 7/2009 | Bathiche et al. | 345/633 |
| 2010/0045701 A1* | 2/2010 | Scott et al. | 345/633 |
| 2010/0149213 A1* | 6/2010 | Navab et al. | 345/633 |
| 2010/0199228 A1* | 8/2010 | Latta et al. | 715/863 |

OTHER PUBLICATIONS

Hsu et al., "Automatic registration and visualization of occluded targets using ladar data", 2003, Society of Photo-Optical Instrumentation Engineers.*
Breen et al., "Interactive Occlusion and Collision of Real and Virtual Objects in Augmented Reality", 1995, European Computer-Industry Research Centre.*
Zhu et al., "Ten-fold Improvement in Visual Odometry Using Landmark Matching", 2007, IEEE.*
Davison, A. "Real-Time Simultaneous Localisation and Mapping with a Single Camera." IEEE ICCV (2003).
Johnson, A. et al., "Vision Guided Landing of an Autonomous Helicopter in Hazardous Terrain." IEEE ICRA (Apr. 2005).
Konolige, K. et al., "Outdoor Mapping and Navigation Using Stereo Vision." In International Symposium on Experimental Robotics (Jul. 2006).
Nister, D. et al., "Scalable Recognition with a Vocabulary Tree." IEEE CVPR (2006).
Olson, C. et al., "Rover Navigation Using Stereo Ego-Motion." Robotics and Autonomous Systems, vol. 43, pp. 215-229 (2003).
Oskiper, T. et al., "Visual Odometry System Using Multiple Stereo Cameras and Inertial Measurement Unit." IEEE CVPR (2007).
Se, S. et al., "Vision-Based Global Localization and Mapping for Mobile Robots." IEEE Trans. on Robotics, vol. 21, No. 3 (Jun. 2005).
Tao, H. et al., "Global Matching Criterion and Color Segmentation Based Stereo." Proc. Workshop on the Application of Computer Vision (WACV)(2000).
Zhu, Z. et al., "Real-Time Global Localization with a Pre-Built Visual Landmark Database." IEEE CVPR (2008).

* cited by examiner

SYSTEM AND METHOD FOR GENERATING A MIXED REALITY ENVIRONMENT

CROSS-REFERENCE TO RELATED APPLICATIONS

This application claims the benefit of U.S. Provisional Patent Application No. 61/108,714 filed Oct. 27, 2008, the disclosure of which is incorporated herein by reference in its entirety.

GOVERNMENT RIGHTS IN THE INVENTION

This invention was made with U.S. Government support under contract number HR01011-07-C-0079. The U.S. Government has certain rights in this invention.

FIELD OF THE INVENTION

The present invention relates generally to a vision method and system, and more particularly to a method and system for generating a 'mixed-reality' environment, combining a visual presentation of the real world and synthetic objects, that may be used in gaming and training applications.

BACKGROUND OF THE INVENTION

Within a mixed-reality environment, a user can interactive with synthetic actors and synthetic objects (hereafter collectively referred to as "synthetic objects"). The term "synthetic object" is intended to include, but is not limited to, any object that can be rendered on a display. The term "mixed-reality environment" is intended to include, but is not limited to, a visual domain wherein a real world user can interact with synthetic objects integrated into a user's view of the real world. For example, when implemented as a training tool for soldiers, a mixed-reality environment may allow for a soldier to interact with synthetic objects that represent enemy troops, wherein the synthetic troops will appear to exist in the real world. According to another example, in an implementation of a mixed-reality environment utilized for gaming (e.g., a tennis match), a user may interact with a synthetic object (e.g., an opponent) and one or more synthetic objects (e.g., a tennis balls).

Currently, virtual reality systems are the primary means of providing a user the ability to interact with synthetic objects. Virtual reality systems create a completely synthetic environment within which a user can interact with synthetic objects. Given that conventional virtual reality systems facilitate user interaction with synthetic objects within an entirely synthetic environment, virtual reality systems do not render synthetic objects in a real life visual domain which allows a user to view a synthetic object within a real world context. As such, virtual reality systems fail to address certain technical obstacles confronted when rendering synthetic objects that appear within the user's perception of the real world. For example, given that virtual reality systems do not capture real world video data, these systems fail to address low latency processing of such real world video data when calculating a user's pose. As such, creation of a mixed-reality environment presents technical issues that are not addressed when creating a virtual reality environment.

Conventional systems and methods for creating a mixed-reality environment also fail to address many of the obstacles confronted when rendering a realistic mixed-reality user experience. For instance, conventional systems and methods for creating a mixed-reality environment fail to utilize low latency video processing in determining a user's pose. Without the use of low latency processing, synthetic objects rendered in a mixed-reality environment may appear to jitter or bounce within a user's field of vision. Such movement may detract for a user's ability to properly interact with the mixed-reality environment. In addition, existing mixed-reality applications fail to accurately calculate the pose of a user-controlled device.

To effectively integrate the actions of a user-controlled device into a mixed-reality environment, the pose of the user-controlled device must be accurately estimated. Accurate estimation of a user-controlled device pose is needed to generate a realistic interpretation of the motion or action of a user-controlled device. For example, in a mixed-reality environment wherein a real world user is simulating a tennis match against a synthetic opponent, the pose of the user's tennis racket must be accurately calculated to determine if the user makes contact with the synthetic tennis ball, in order to translate the effect of returning the synthetic opponent's serve into the mixed-reality environment. Conventional methods and systems for creating mixed-reality environments lack efficient processes, systems, and devices for calculating the pose of a user-controlled device.

The prior art lacks a mixed-reality environment that can effectively meet the current needs within the training and gaming sectors. More specifically, the prior art lacks a method and system for providing low latency processing of a user's pose together with the accurate calculation of the relative pose of a user-controlled device.

SUMMARY OF THE INVENTION

Embodiments of the present invention satisfy these needs and other needs by providing a system and method for generating a mixed-reality environment. As used herein, the term mixed-reality environment may include a visual domain wherein a real world user can interact with synthetic objects integrated into a user's view of the real world. In a mixed-reality environment, a user views, hears and experiences the real world live with his or her own senses (eyes, ears, touch etc). However, the user's experience of the real world is augmented with the overlay of synthetic objects in a user's visual field of view and corresponding sounds, smells and other stimuli for the mixed reality scene. The real world scene is augmented so that the synthetic objects appear and sound like that they are present in the real world scene. According to certain embodiment of the present invention wherein multiple users are present in a single mixed-reality environment, each users may experience the synthetic objects to be in the same location within the mixed-reality environment. A mixed-reality environment may be used for many applications, including, for example, military training and video gaming.

To generate a mixed-reality environment, embodiments of the present invention may employ a mixed-reality generation computer system comprising a user-worn sub-system communicatively connected to a synthetic object computer module. The user-worn sub-system may utilize a plurality of user-worn sensors to capture and process data regarding a user's pose and location. The synthetic object computer module may generate and provide to the user-worn sub-system one or more synthetic objects based information defining a user's real world life scene or environment indicating a user's pose and location. The synthetic objects may then be rendered on a user-worn display, thereby inserting the synthetic objects into a user's field of view. Rendering the synthetic objects on the user-worn display creates the virtual effect for the user that the synthetic objects are present in the real world.

According to an embodiment of the present invention, a user-worn sub-system comprises hardware used to generate the mixed-reality environment. The user-worn sub-system may be comprised of one or more video sensors (e.g. video cameras) and/or a LIDAR system, an Inertial Measurement Unit (IMU), a Global Positioning System (GPS) sensor, a computer processor, and a see-through MID (Head mounted display) or eyewear. A see-through HMD may be any medium configured to render an object while still allowing a user to see through the medium at any location where an object is not being rendered and view the user's real life environment. The one or more video cameras, IMU, and GPS sensor may generate a data set used by the computer processor to calculate a pose estimation data set, wherein the pose estimation data set may determine the pose and location of a user, a user's head, and a user-controlled device. This pose estimation data set enables the user-worn sub-system to appropriately position and occlude synthetic objects in a user's field of view, thereby accurately integrating the synthetic objects into the mixed-reality environment.

Under certain circumstances, the data used to calculate a pose estimation data set may be received by a computer processor, or pose estimation computer module, at different times. The most common issue arises when camera pose data from one or more video sensors lags behind the arrival of data generated by the IMU. Given that both pieces of data are utilized to calculate a pose estimation data set, this lag may increase latency when calculating a pose estimation data set. As such, embodiments of the present invention may utilize low latency processing techniques, such as estimating the camera pose data, in instances where such a lag may affect the calculation of a pose estimation data set and thereby affect the user experience. Such low latency processing enables synthetic objects to appear stable and reduce jitter or drifting of the synthetic objects within a user's field of view. As a result, embodiments of the present invention utilize one or more approaches to effectively estimate camera pose data to enable low latency processing needed to create a realistic mixed-reality environment.

The pose estimation data set may also include data representing parameters and attributes of a user-controlled device. To effectively integrate the actions and movement of a user-controlled device into a mixed-reality environment, the pose of the user-controlled device must be accurately estimated. Embodiments of the present invention utilize one or more techniques for calculating the pose of a user-controlled device. These techniques include utilizing a video sensor mounted on the user-controlled device, utilizing a video sensor mounted on the user-controlled device and one or more user-worn video sensors, and/or utilizing one or more user-worn video sensors in conjunction with markers coupled to the user-controlled device. Each of these techniques, discussed in greater detail below, allow for the estimation of the pose of a user-controlled device, thereby allowing for the virtual effect of a user-controlled device to be integrated into a mixed-reality environment.

Embodiments of the present invention utilize a see-through head mounted display (HMD) to render the synthetic objects. Rendering the synthetic objects with a see-through HMD creates a mixed-reality environment wherein the users may view and interact with both the real world environment and the rendered synthetic objects via a single integrated view of perspective. Embodiments of the present invention may also insert sound effects into the mixed-reality environment by transmitting sound effects to a user through a headset, or other sound producing device.

According to additional embodiments of the present invention, multiple users may simultaneously interact within a single mixed-reality environment. Each user may view his or her portion or perspective of a common mixed-reality environment through their individual see-through HMD. The synthetic objects appear to be in the same mixed-reality environment and consistently located within the mixed-reality environment for each users. In such an embodiment of the present invention, users may interact with synthetic objects as well as other real world users.

Embodiments of the present invention may be configured for use indoors, outdoors, or a combination of the two.

Embodiments of the present invention are directed to a system and method for generating synthetic objects that can be visually integrated into a real world scene. Such embodiments relate to a system and method for projecting a synthetic object onto a user-worn display, the display configured to present the user's view of an actual or real world scene. To project a synthetic object onto a user-worn display, embodiments of the present invention comprise the steps of: receiving a data set relating to the actual scene from at least one sensor worn by the user; performing pose estimation based on at least a portion of the data set, to produce a pose estimation data set; performing depth analysis based on at least a portion of the data set, to produce a depth data set; generating the synthetic object; and rendering the synthetic object onto the user-worn display, thereby providing the user with an updated view which includes the synthetic object integrated into the user's view of the actual scene. The synthetic objects are rendered onto the user-worn display taking into account any occlusion effects based on whether the synthetic objects are behind or in front of other objects in the scene,

BRIEF DESCRIPTION OF THE DRAWINGS

The present invention will be more readily understood from the detailed description of exemplary embodiments presented below considered in conjunction with the attached drawing, of which.

DETAILED DESCRIPTION OF THE INVENTION

The present invention relates to a system and method for generating a mixed-reality environment that may be used in training or gaming platforms, among other applications. In addition to facilitating the creation of a mixed-reality environment, embodiments of the present invention overcome the primary obstacles in the prior art, and create a seamless user experience by accurately estimating a camera pose when calculating a pose estimation data set and estimating the pose of a user-controlled device. Each of these features of embodiments of the present invention are described in detail below.

As used herein, the term "pose" is intended to include, but is not limited to, the physical orientation of a body, portion of a body, or physical object within a real world scene. Furthermore, the term pose may be defined by six degrees of freedom parameterization, including three parameters used to triangulate a user's location and three parameters that refer to rotational angles, such as yaw, pitch and roll.

Figure 1:
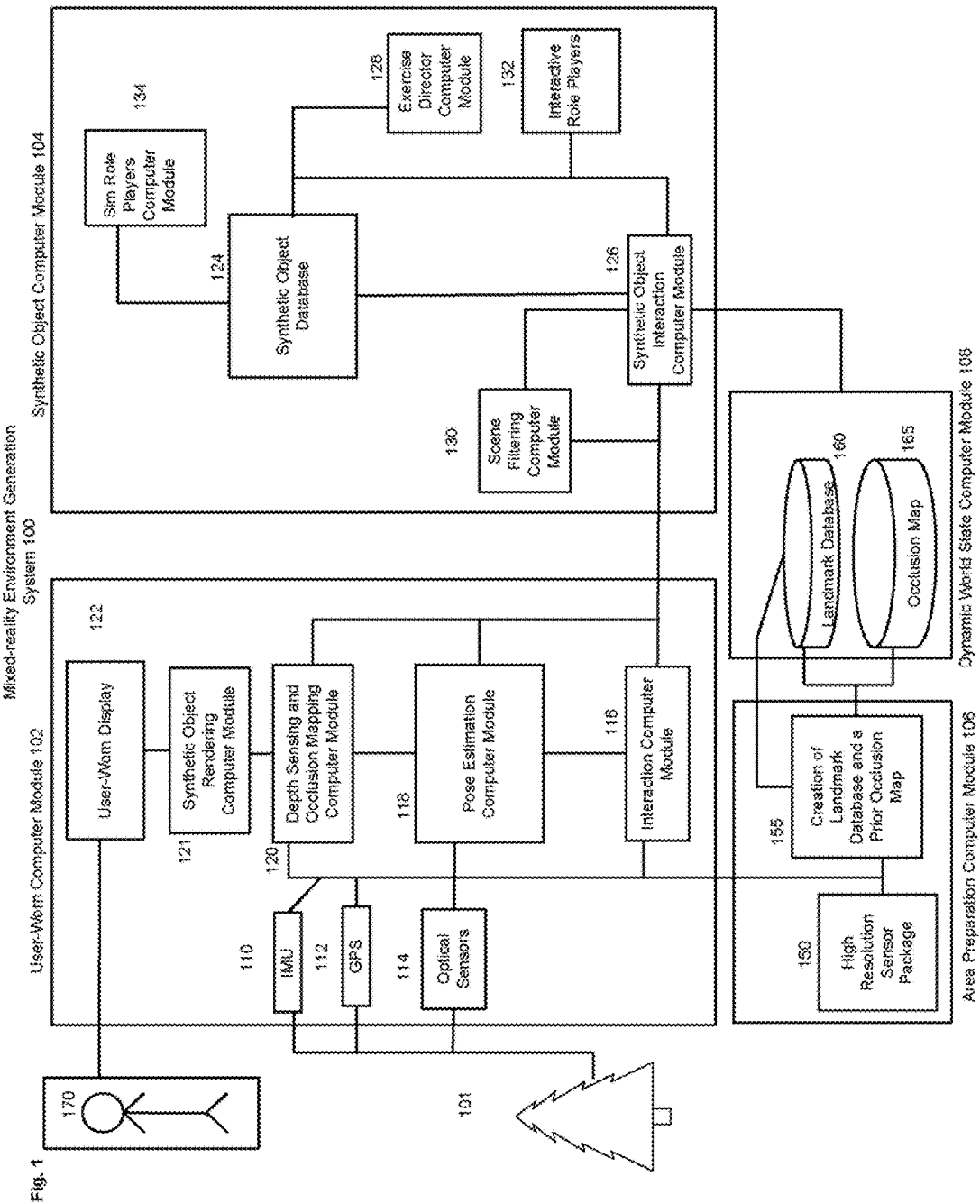
FIG. 1 illustrates an exemplary system for creating a mixed-reality environment, according to an embodiment of the present invention.

An overall system diagram according to an embodiment of the present invention is shown in FIG. 1 and is referred to as the Mixed-Reality Environment Generation System 100. As illustrated in FIG. 1, the Mixed-Reality Environment Generation System 100 may be comprised of four primary computer modules: a User-Worn Computer Module 102, a Synthetic Object Computer Module 104, an Area Preparation Computer Module 106, and a Dynamic World State Computer Module 108. As illustrated in FIG. 1, each of the aforementioned computer modules 102-108 may comprise one or more computer modules or sub-modules. As used herein, the term "computer module" is intended to include any data processor, data processing device, such as a desktop computer, a laptop computer, a mainframe computer, a personal digital assistant, a server, a handheld device, or any other device able to process data. The term computer module may also include software configured to process or manipulate data. As such, a computer module, may include, a component or set of components functioning together to perform a task and may comprise software, hardware, or a combination of software and hardware.

According to an embodiment of the present invention, a user may wear or carry the User-Worn Computer Module 102. User-Worn Computer Module 102 is configured to capture real world information and render synthetic objects on a user-worn display, while the user moves within a real world environment. Rendering a synthetic object 170 on a User-Worn Display 122, creates a mixed-reality environment wherein, from the user's perspective, the synthetic object 170 appears to exist within the real world scene.

Figure 2:
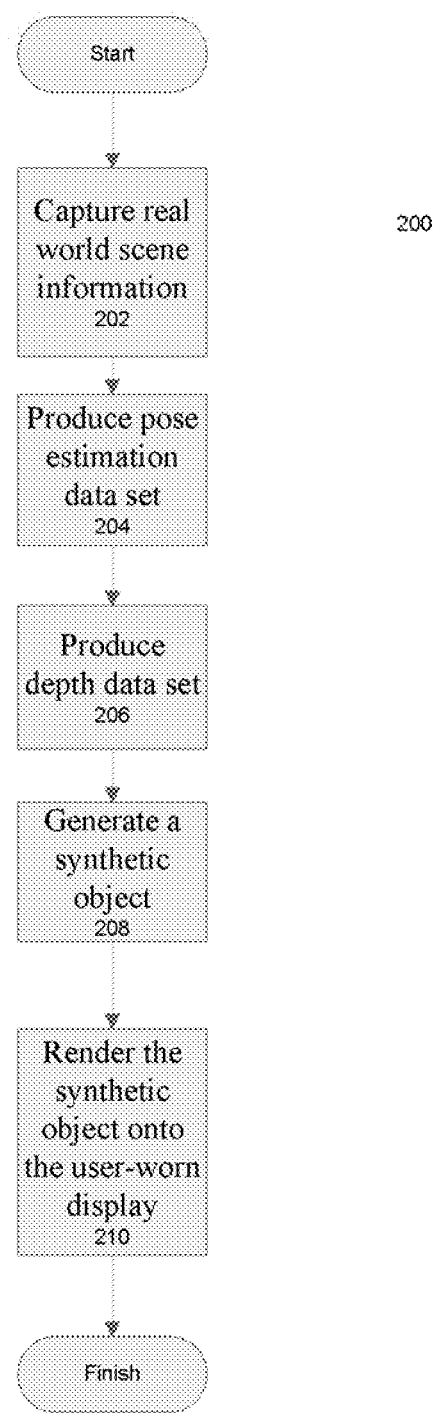
FIG. 2 illustrates an exemplary method for generating a mixed-reality environment, according to an embodiment of the present invention.

The Mixed-Reality Environment Generation System 100 may be used to create a mixed-reality environment according to method 200, illustrated in FIG. 2. Method 200 begins at step 202 by receiving a data set from the one or more user-worn sensors. The User-Worn Computer Module 102 may be configured to capture real world scene information. The term "real world scene information" is intended to include, but is not limited to, information regarding a pose and location of a user, in addition to, depth information regarding real world objects. Real world scene information may include data captured by a video sensor, audio sensor, electromagnetic wave sensor, or other sensing device. Real world scene information may also include video captured by one or more sensors worn by the user. As illustrated in FIG. 1, the User-Worn Computer Module 102 may comprise an inertial measurement unit (IMU) 110, a GPS sensor 112, an Optical Sensor 114, an Interaction Computer Module 116, a Pose Estimation Computer Module 118, a Depth Sensing and Occlusion Mapping Computer Module 120, and a User-Worn Display 122. Multiple users may simultaneously interact within a single mixed-reality environment. In such an embodiment of the present invention, each user may be equipped with a User-Worn Computer Module 102. In alternative embodiments of the present invention, portions of the User-Worn Computer Module 102 may not be worn or carried by the user, but instead be physically located remote from the user while being communicatively connected to at least one portion of the User-Worn Computer Module 102 being worn by the user.

According to embodiments of the present invention, one or more sensors may capture real world scene information. The plurality of sensors may include the IMU 110, the GPS sensor 112 and the Optical Sensor 114. The IMU 110 may be a sensor configured to detect changes in pitch, roll, and yaw and generate a data set that describes changes in the pitch, roll, and yaw. Optionally the GPS sensor 112 is configured to communicate with the Global Positioning System to determine the geo-spatial location of the GPS sensor 112, thereby determining the location of the user. The Optical Sensor 114 may include one or more sensors, such as a camera, LIDAR sensor, Flash LIDAR sensor, or other device capable of capturing video, and in certain instances processing video. According to certain embodiments of the present invention, the Optical Sensor 114 may be mounted on a user's helmet and configured to capture video of the real world scene (i.e., in front of and behind a user). As illustrated in FIG. 1, the Optical Sensor 114 may capture video reflective of the real world scene 101. The real world scene information captured by the IMU 110, the GPS sensor 112 and the Optical Sensor 114 may be provided to the Pose Estimation Computer Module 118 and the Depth Sensing and Occlusion Mapping Module 120 for processing, as described in detail below.

In addition to the IMU 110, the GPS sensor 112 and the Optical Sensor 114, the Interaction Computer Module 116 may capture at least a portion of the real world scene information. The Interaction Computer Module 116 may identify actions performed by the user. These actions could include arm and leg movements, as well as the positioning of a user-controlled device. The term "user-controlled device" is intended to included, but is not limited to, a physical object that a user may hold, or otherwise interact with, that allows the user's actions with respect to the device to be integrated into and simulated in the mixed-reality environment. An example of a user-controlled device may include, but is not limited to, a weapon or a tennis racket. As such, the action of firing a weapon or swinging a tennis racket may be integrated into a mixed-reality environment. The Interactive Computer Module 116 may capture information from additional sensors mounted on the user or user-controlled device. The real world scene information captured by the Interactive Computer Module 116 may be provided to the Pose Estimation Computer Module 118 and the Depth Sensing and Occlusion Mapping Module 120 for processing. The Interactive Computer Module 116 may also capture audio, such as voice data from the user or other audio source, from the real world scene.

Following the capture of the real world scene information, in step 202, method 200 continues by producing a pose estimation data set based on at least a portion of the captured real world scene information, at step 204. The pose estimation data set may include data reflective of the pose of a user's body, a user's head, or user-controlled device. The pose estimation data set may be used to generate the appropriate synthetic object to be included in a given mixed-reality environment. In addition, the pose estimation data may be necessary to properly align synthetic objects when rendering the synthetic objects onto a user-worn display. For optimal alignment of a synthetic object, the pose estimation data set should estimate a pose within 0.05 degrees of a real world pose. Pose information within a pose estimation data set may provide information reflective of movement within six degrees of freedom.

According to the embodiment of the present invention illustrated in FIG. 1, the pose estimation data set may be generated by the Pose Estimation Computer Module 118. The Pose Estimation Computer Module 118 may receive the real world scene information from the IMU 110, GPS sensor 112, Optical Sensor 114, and Interaction Computer Module 116. The Pose Estimation Computer Module 118 may utilize the real world scene information and landmark information from a landmark database, such as the Landmark Database 160, to generate a pose estimation data set. The landmark database may comprise a collection of data structures wherein each data structure represents a distinct real world visual landmark. The process of producing a pose estimation data set is described in further detail in U.S. patent application Ser. Nos. 11/949,433, 12/203,322, and 11/833,498 which are herein incorporated by reference.

To create a mixed-reality environment wherein the synthetic objects do not jitter or drift within a user's field of view, low latency processing is used when calculating the estimated pose data set. In certain circumstances, the real world scene information captured by the Optical Sensor 114 may lag with respect to the real world scene information captured by the IMU 110. According to certain embodiments of the present invention, both the IMU 110 and the Optical Sensor 114 real world scene information for the IMU 110 and the Optical Sensor 114 is needed to effectively calculate a pose estimation data set at the time of generating or rendering a synthetic objects. Typically, video frames arrive at a rate slower than the IMU data rate. For example, video frames may arrive at a rate of 15-30 Hz and the IMU data may arrive at a rate of 100 Hz.

In certain circumstances there may be a discrepancy between the speed at which a user moves his or her head and the rate at which video may be captured and processed. As a result, synthetic objects may appear to bounce within the mixed-reality environment. However, embodiments of the present invention may utilize data generated from the IMU 110 in conjunction with the video frames captured by an Optical Sensor 114 to address this issue, as described in detail below.

Embodiments of the present invention may utilize one of the following approaches to compensate for the discrepancy between the speed at which a user moves his or her head and the rate at which video may be captured and processed. The first approach is to predict the camera pose at the rendering time based on the constant translational velocity and constant rotational velocity. Based on the data from video frames captured at time t, the camera pose at time t+1 may be calculated by assuming that the movement of the camera pose between time t and t+1 occurs at a constant translational velocity and a constant rotational velocity. According to certain embodiments of the present invention, a Kalman filter may be utilized when estimating the camera pose based on the constant translational velocity and the constant rotational velocity. The Kalman filter may use the higher data rate IMU data, with a data rate around 100 Hz, to improve the pose prediction even though the video frames may have a data rate around 30 Hz. As a result, in instances where a lag exists between the arrival of a video object and the arrival of corresponding IMU data, a prediction of the camera pose may be used when generating a pose estimation data set.

According to a second exemplary approach, readings from a gyroscope included on the User-Worn Computer Module 102 may be utilized. In such an approach, the gyroscope produces data points based on a camera pose. These data points are integrated to determine the incremental rotational motion between the arrival of a first camera pose and a second camera pose. During such integration, it is assumed that the rotational velocity of the camera pose remains constant. As a result of these two approaches, embodiments of the present invention may provide for low latency video frame processing and thereby produce a pose estimation data set despite a lag between inputs from the at least one sensor on the User-Worn Computer Module 102.

Returning to step 204, the pose estimation data set may also include data regarding a user-controlled device, such as a mock weapon. In a mixed-reality environment, a user may simulate shooting a synthetic object with a user-controlled device. As such, a determination is made to estimate if the user properly aimed the user-controlled device (e.g., weapon) to successfully shoot the synthetic object. Without proper aiming, the virtual effect of a user's action may not be accurately accounted for or displayed. The term "virtual effect" is intend to include, but is not limited to, the result of a user's real life motion or action in a mixed-reality environment. Fox example, according to an embodiment of the present invention wherein the user-controlled device is a weapon, the user-controlled device pose, and its relative orientation with respect to the user's pose, could be used for establishing weapon aiming and determining the virtual effect of a user firing the weapon. To establish that a weapon is properly aimed, a user-controlled device pose is calculated. The user-controlled device pose may be calculated by the Pose Estimation Computer Module 118. According to certain embodiments of the present invention, one of at least three methods may be used to calculate a user-controlled device pose. Regardless of the method used to calculate the user-controlled device pose, such user-controlled device pose may be incorporated into a pose estimation data set.

The first two exemplary methods for calculating the user-controlled device pose utilize a camera mounted on the user-controlled device. By way of example, if the user-controlled device is a mock weapon, the weapon camera is aligned with the center of the weapon's barrel. In the first approach, the weapon camera captures video of the real world scene located in the weapon camera's field of view. The objects present in the captured video are then matched to the landmark database, according to the methods described above with reference to establishing the pose of a user's head. Based on matching the captured objects with the landmark database, the user-controlled device pose may be determined.

In an additional embodiment of the present invention, a user-controlled device pose could be calculated through the use of two independent cameras, wherein one camera is mounted on the weapon and the second camera is mounted on the user, or User-Worn Computer Module 102. To calculate the user-controlled device pose through the use of the weapon camera and user-mounted camera, objects captured by the weapon camera may be matched to the objects captured by the user-mounted camera. As a result of the matching between the objects identified by the two different sensors, the relative orientation and position of the weapon with respect to the user may be estimated. Given that the pose of the user has been established, as described above, the user-controlled device pose may be established based on the pose of the user and the relative orientation and position of the weapon compared to the pose of the user.

Figure 3:
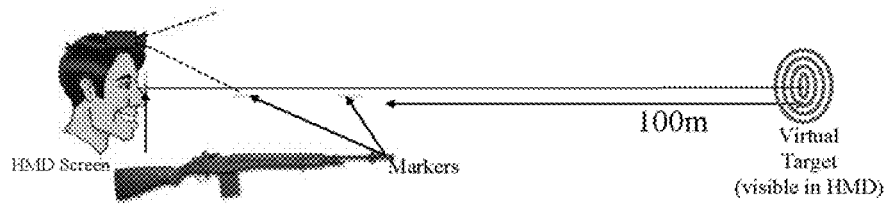
FIG. 3 illustrates an exemplary method of calculating a pose of a user-controlled device, according to an embodiment of the present invention.

In a further embodiment of the present invention, the user-controlled device pose may be calculated through the use of a user-mounted camera and at least two fiducial markers, or markers, mounted on the user-controlled device (e.g. mock weapon). An example is illustrated in FIG. 3, wherein two markers are mounted on the barrel end of the mock weapon (user-controlled device). These markers are visible to at least one user-mounted camera. As such, the positioning of the markers is calculated through an analysis of the object information captured by the user-mounted camera. In an embodiment of the present invention wherein the user mounted sensors include two cameras in stereo configuration, the markers may be seen through the left camera and the right camera. Based on the view from the left camera and the right camera, the location of the markers may be triangulated and, as a result, the pose of the user-controlled device may be determined. Having performed pose estimation at step 204 to calculate the pose estimation data set, process 200 continues at step 206 by performing depth analysis.

Depth analysis performed in step 206 produces a depth data set, or depth map, wherein the depth data set defines a mapping of the distance between the user and one or more real world objects observed by a user. The depth data set may be calculated using a pair of cameras in stereo orientation worn by the user or LIDAR Sensors worn by the user. When a pair of cameras in stereo orientation is used, the images captured by the pair of cameras are correlated to compute disparities along scan lines. This correlation allows for the computation of the depth of a real world object present in the images using triangulation. In certain embodiments of the present invention, pre-computed calibration between the pair of camera may be conducted to produce a more accurate depth analysis. In the case of LIDAR, the optical laser pulse emitted is actively received by a receiver unit to estimate the distance between the user and the one or more real world objects. The depth estimation can be further improved by using pre-computed 3D model of the world. One having ordinary skill in the art will appreciate the other methods of depth analysis may be used to create a depth data set.

According to the Depth-Sensing and Occlusion Mapping Computer Module 120 may be used to perform depth analysis according to step 206. The Depth-Sensing and Occlusion Mapping Computer Module 120 is configured to generate depth maps, or depth data sets, based on real world scene information obtained from the user-worn sensors. The depth data set may include information regarding the depth of at least one real world object within a user's field of vision (i.e., real world scene). In addition to utilizing the depth data set when generating the mixed-reality environment, the depth data set may be used to update the occlusion reasoning within the Dynamic World State Computer Module 108. The occlusion reasoning may be used to properly occlude a synthetic object when rendering the synthetic object on a see-through HMD. The occlusion reasoning includes obtaining local temporal actions of synthetic objects and evaluating their positions against the integrated model and pose estimation data set from the Pose Estimation Computer Module 118. An occlusion map may be computed using the depth data set. Occlusion map identifies which pixels on a display are classified as part of a synthetic object and which pixels on the display are classified as being part of a real world object. When computing the occlusion map, a depth data set is compared against depth estimates associated with a synthetic object. As a result of such comparison, pixels may be classified as being part of a synthetic object or being part of a real world object. In an embodiment of the present invention utilizing a see-through HMD only the pixels classified as begin part of a synthetic object may be rendered. The synthetic objects are then rendered using this occlusion map to ensure that proper occlusion is used when projecting the synthetic objects into the mixed-reality environment. According to a preferred embodiment of the present invention, the occlusion map is computed at 30 frames per second or at the rate at which synthetic objects are rendered in order to reduce jitter or drift when rendering a synthetic object. The depth map for the background scene can be computed from a 3D model of the scene. The depth map for foreground objects can be computed using stereo processing of the video camera feeds mounted on User-Worn Computer Module 102. Alternatively a LIDAR sensor or other 3D sensors may be used.

Following step 206, the method 200 continues by generating one or more synthetic objects, at step 208. According to the Synthetic Object Computer Module 104 is configured to generate the one or more synthetic objects that are to be included in a mixed-reality environment. The Synthetic Object Computer Module 104 communicates with the Area Preparation Computer Module 106 and the Dynamic World State Computer Module 108 to create the synthetic objects and maintain the movement and actions of the synthetic objects within the mixed-reality environment. The Synthetic Object Computer Module 104 determines the necessary synthetic objects to include in a given mixed-reality environment based on the pose estimation data set and the depth data set received from the User-Worn Computer Module 102. Following the generation of a synthetic object, the Synthetic Object Computer Module 104 may transmit the synthetic object to the User-Worn Computer Module 102 to be included in the mixed-reality environment. One having ordinary skill in the art will appreciate that the Synthetic Object Computer Module 104 may be a single processor or a collection of distributed processors.

As illustrated in FIG. 1, the Synthetic Object Computer Module 104 may be comprised of a plurality of modules, wherein the modules are configured to create and maintain the synthetic objects required to generate a mixed-reality environment. The Synthetic Object Computer Module 104 could include any commercial gaming system (e.g. Sony Playstation™, Microsoft Xbox™, or Nintendo Wii™). According to an embodiment of the present invention, as illustrated in FIG. 1, the Synthetic Object Computer Module 104 comprises a plurality of modules, including a Synthetic Object Database 124, a Synthetic Object Interaction Computer Module 126, an Exercise Director Computer Module 128, a Scene Filtering Computer Module 130, an Interactive Role Player 132 and a Simulation Role Player Computer Module 134.

According to certain embodiments of the present invention, real world users may interact with other real world users or synthetic objects. In turn, the synthetic objects may interact with the real world users. The Synthetic Object Computer Module 104 is configured to estimate if a synthetic objects has been affected by the actions of a real world user or other synthetic objects and thereby cause the synthetic objects to react appropriately. Similarly, the Synthetic Object Computer Module 104 is configured to determine if a user has been interacted with or affected by the actions of a synthetic object or real world user and provides the appropriate and corresponding audio, visual, and/or tactile feedback to the user.

The Synthetic Object Database 124 maintains a collection of synthetic objects, game-rules, story-lines, models, and missions that define scenarios and interactions that may be utilized to create a mixed-reality environment. For example, the Synthetic Object Database 124 may store the data representing a synthetic soldier, military training exercise, as well as the logic and rule that dictate how the synthetic soldier is to act and move within the military training exercise.

The Synthetic Objects Interaction Computer Module 126 is configured to utilize the Synthetic Object Database 124 to aid in creating the mixed-reality environment. The Synthetic Objects Interaction Computer Module 126 may determine which synthetic objects to display to the user to create a mixed-reality environment, and query the Synthetic Object Database 124 for the required synthetic objects. Furthermore, the Synthetic Objects Interaction Computer Module 126 may determine which synthetic objects are required for a given storyline, mission, or gaming rules associated with a given mixed-reality simulation. The Synthetic Objects Interaction Computer Module 126 may receive a pose estimation data set and a depth data set from the User-Worn Computer Module 102 to determine which synthetic objects to be included in a mixed-reality environment. In addition, the Synthetic Objects Interaction Computer Module 126 may ensure that synthetic objects are consistently rendered from each user within a mixed-reality environment. For example, if two users are viewing the same synthetic soldier, the Interaction Computer Module 126 may ensure that the synthetic soldier is properly oriented in each user's view and that the actions of the synthetic soldier from each user's unique perspective are consistent across the multiple user perspectives.

[Given the pose estimation the synthetic objects are rendered from the perspective of the user worn display. Similarly based on calibration (between the video/LIDAR sensors and display unit) the depth estimates are represented from the user worn display These are combined as described in paragraph 41.]

According to certain embodiments of the present invention, some of the synthetic objects selected by the Synthetic Objects Interaction Computer Module 126 may be further filtered by the Scene Filtering Computer Module 130, prior to transmitting the synthetic objects to the User-Worn Computer Module 102. The Scene Filtering Computer Module 130 may remove a synthetic object from the one or more synthetic objects transferred to a User-Worn Computer Module if the synthetic object is not required or appropriate for the creation of a given mixed-reality environment. For example, the Synthetic Objects Interaction Computer Module 126 may select a synthetic soldier to include in a mixed-reality environment, however, based on a change in a user's pose, the selected soldier may lay outside a user's field of vision. In this instance, the Scene Filtering Computer Module 130 filters out the synthetic soldier given that the synthetic soldier is not required or appropriate from the accurate creation of the current mixed-reality environment.

In addition, the Synthetic Object Computer Module 104 illustrated in FIG. 1 comprises a Sim Role Player Computer Module 134. The Sim Role Player Computer Module 134 comprises a motion-capture suit worn by a user. The motion capture suit allows the user to control the actions of a synthetic object included in the mixed-reality environment. In addition, a motion-capture suit may allow for more detailed animation of synthetic object driven by a personal experience of the user of the motion-capture suit, as opposed to the movements of the synthetic characters being controlled by a game engine.

According to the embodiment of the present invention illustrated in FIG. 1, the Exercise Director Computer Module 128 may be used to guide the direction of the training exercise or game being created by the Synthetic Object Computer Module 104.

The Synthetic Object Computer Module 104 may also utilize the Area Preparation Computer Module 106 when generating the synthetic objects according to step 206 of method 200. The Area Preparation Computer Module 106 may be used to collect and process the real world scene information to augment the mixed-reality environment. This may include building a comprehensive 3D model of a real world environment, pre-collecting related landmark information and developing mappings between the mixed-reality simulation and the real world. Additional embodiments of the present invention could incorporate the use of a comprehensive 3D model, such as a 3D model constructed through the use of LIDAR technology, to model the real world environment.

According to an embodiment of the present invention as illustrated in FIG. 1, the Area Preparation Computer Module 106 may include two modules: a Hi-resolution Sensor Package 150 and a Landmark Database/Occlusion Maps Creation Module Computer 155. The Hi-resolution Sensor Package 150 may be any user-wearable unit such as, for example, a helmet or eyewear system comprising one or more sensors used to pre-survey a real world environment in order to build a landmark database. Pre-surveying a real world environment may include utilizing one or more sensors to populate the landmark database prior to relying on the landmark database to create a mixed-reality environment. The data captured from the Hi-resolution Sensor Package 150 is provided to the Landmark Database/Occlusion Maps Creation Module Computer 155 to generate landmark data and occlusion maps. The Landmark Database/Occlusion Map Creation Module 155 pre-processes the high-resolution sensor data to create 3D models, landmark databases and occlusion maps of the scene. The 3D model and landmark database are used by the Mixed-Reality Generation System 100 during a training exercise or game to track the pose of a user and user-worn computer module. The 3D model is used by the Synthetic Object Computer Module 104 to plan and control the movements of synthetic actors and for placement of synthetic objects. The 3D models and occlusion maps are also used to perform occlusion reasoning when rendering synthetic objects on the display of a user.

The generating landmark and occlusion maps may be stored in Landmark Database 160 and Occlusion Map Database 165, included in the Dynamic World State Computer Module 108. The Dynamic World State Computer Module 108 is configured to maintain landmark data and occlusion maps. The Landmark Database 160 and the Occlusion Map Database 165 may be accessed by the Synthetic Object Computer Module 104 to retrieve landmark data and occlusion maps used to generating synthetic objects. An initial version of the Landmark Database 160 and Occlusion Map Database 165 may be built prior to a user initializing a mixed-reality environment, however these databases may be updated as the user interacts with a mixed-reality environment. The Landmark Database 160 may also be accessed by the User-Worn Computer Module 102 when creating a pose estimation data set and depth data set.

Following the generation of the synthetic objects at step 208, the Synthetic Object Computer Module 104 transmits the synthetic objects or instructions regarding how to render a synthetic object to the User-Worn Computer Module 102 to render the synthetic objects on the user-worn display, in step 210. Such rendering may be performed by the Synthetic Object Rending Computer Module 121. According to an embodiment of the present invention as illustrated in FIG. 1, the Synthetic Object Rending Computer Module 121 may receive the synthetic objects and utilize occlusion maps for each of the synthetic objects to properly determine the occlusion, pose, and depth for each synthetic object. Each synthetic object may have a corresponding occlusion map retrieved from the Occlusion Map Database 165. The occlusion for each synthetic object may be retrieved from the Dynamic World State Computer Module 108. Based on the occlusion map, the pose estimation data set, and the depth data set, the Synthetic Object Rending Computer Module 121 determines the occlusion, pose, and depth for each synthetic object. Having determined the proper occlusion, pose, and depth for each synthetic object, the Synthetic Object Rending Computer Module 121 transmits the aligned object to the User-Worn Display 122, wherein the synthetic object is rendered on the user-worn display. According to certain embodiments of the present invention, the Synthetic Object Rending Computer Module 121 may be communicatively connected to the User-Worn Display 122, or alternatively, the Synthetic Object Rending Computer Module 121 may be integrated into the User-Worn Display 122. The synthetic object is rendered on the user-worn display in an integrated manner to provide the appearance that the synthetic object 170 exists in the real world scene, thereby creating a mixed-reality environment. The synthetic object is rendered using the computed pose estimation data set and therefore the rendered synthetic objects appear aligned with the real world.

According to certain embodiment of the present invention, the User-Worn Display 122 comprises a see through video display configured to render one or more synthetic objects. According the certain embodiments of the present invention, a User Worn Display 122 may be a video or optical see-through head mounted display or eyewear which includes transparent displays. Each pixel of the User Worn Display 122 may be transparent or may be used to render a portion of a synthetic object.

Figure 4:
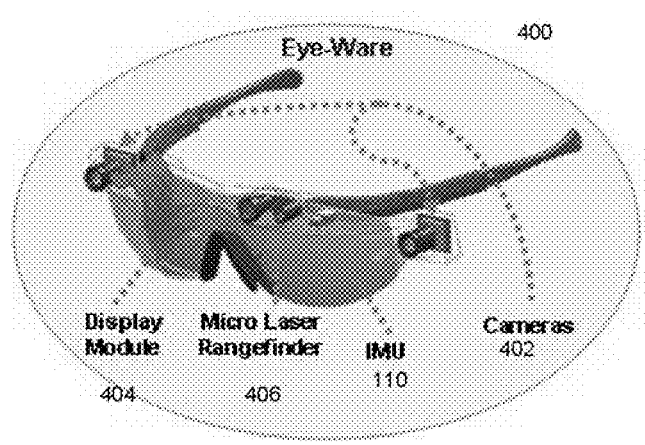
FIG. 4 illustrates a exemplary see-through HMD that can be worn by a user, according to an embodiment of the present invention.

According to embodiments of the present invention, a user may view the mixed-reality environment on a user-worn display, such as the see-through HMD illustrated in FIG. 4. If the user-worn display is monocular, a single rendered synthetic object may be presented to a single eye. If the user-worn display is binocular, as illustrated in FIG. 4, different synthetic objects are captured by each Camera 402 to account for the parallax difference between the two views. As a result, occlusion, pose, and depth is generated for each of the different synthetic objects to be projected onto the Display Module 404. The see-through HMD 400 allows the user to view the real-world while simultaneously providing a medium upon which synthetic objects may be rendered. According to the embodiment of the see-through HMD illustrated in FIG. 4, the IMU 110 and Cameras 402 are located on the see-through HMD 400. According to such an embodiment of the present invention, the remaining components of the User-Worn Computer Module 102 may be mounted on or carried by the user. In alternative embodiments of the present invention, additional components of the User-Worn Computer Module 102 may be mounted on the see-through HMD 400 or mounted on a helmet worn by the user. A Micro Laser Rangerfinder 406 may be integrated with the see-through HMD to compute the depth data set and may be used to assist in the computation of the position of a synthetic object in the mixed-reality environment.

According to an embodiment of the present invention, one or more users may interact within a single mixed-reality environment. For example, an embodiment of the present invention may be used to create a single mixed-reality environment wherein one or more synthetics objects are consistently rendered on a user-worn display of a first user and a user-worn display of a second user. As a result, the rendered synthetic object will be appropriately positioned within the view of the first user and the view of the second user, while at the same time, the appropriately positioned within the single mixed-reality environment. In such an embodiment, a pose estimation data set and depth data set is captured for the first user and a pose estimation data set and depth data set is captured from the second user. In addition, a synthetic object is selected by the Synthetic Object Computer Module 104 and information associated with the selected synthetic object is transmitted to a user-worn computer module associated with the first user and a user-worn computer module associated with the second user. Each of the user-worn computer modules will render the synthetic object on the respective user-worn display, wherein the synthetic object is rendered within the respective user's view based on the information associated with the selected synthetic object and the users' respective pose estimation data set and depth data set. As a result, the synthetic object will be consistently rendered within each user's view and will also be consistently located within the single mixed-reality environment.

In embodiments of the present invention wherein the mixed-reality environment is used for training or gaming purposes, the system may track a user's performance and provide performance evaluation. The system is configured to provide a review of the gaming or training exercise. For instance, a user-mounted camera may be used to create a video of the mixed-reality environment from a user's perspective. The video may be recorded and played back to analyze a user's performance. Video from multiple users may also be presented simultaneously. The video from multiple users can be viewed using a 3D model of the mixed-reality environment. Using the pose information and the 3D model, the video from each user can be overlaid on the 3D models and then re-projected from new view-points. Multiple video streams can be projected simultaneously on the 3D model, to form a fused video.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

We claim:

1. A method of rendering a synthetic object onto a user-worn display showing a user's view of a real world scene, the method comprising the steps of:
    capturing real world scene information using one or more user-worn sensors;
    producing a first pose estimation data set and a first depth data set based on at least a portion of the captured real world scene information, wherein the first pose estimation data set includes predicted inter-frame pose information for at least one camera of the one or more user-worn sensors to compensate for a data capture time lad between the at least one camera and at least one other user-worn sensor of the one or more user-worn sensors;
    receiving the synthetic object generated in accordance with the first pose estimation data set and the first depth data set;
    rendering the synthetic object onto the user-worn display in accordance with the first pose estimation data set and the first depth data set, thereby integrating the synthetic object into the user's view of the real world scene;

producing a second pose estimation data set and second depth data set for a user-controlled device; and determining, based at least in part on the first pose estimation data set and the second pose estimation data set, whether a user-controlled device has interacted with the synthetic object and causing the synthetic object to react to the interaction based at least in part on the first pose estimation data and the second pose estimation data set.

2. The method of claim 1, wherein the real world scene information is captured only by the one or more user-worn sensors.

3. The method of claim 1, wherein the one or more user-worn sensors comprises a first video camera and a second video camera in stereo configuration.

4. The method of claim 3, wherein the user-controlled device includes a marker and producing the second pose estimation data set for the user-controlled device comprises:

receiving a first video frame of the marker from a first video camera;

receiving a second video frame of the marker from a second video camera; and utilizing the first video frame and the second video frame to triangulate a location of the marker, thereby producing the second pose estimation data set for the user-controlled device.

5. The method of claim 1, wherein one of the one or more user-worn sensors comprises a LIDAR sensor.

6. The method of claim 1, wherein one of the one or more user-worn sensors comprises an inertial measurement unit.

7. The method of claim 1, wherein one of the one or more user-worn sensors comprises a global positioning system sensor and an inertial measurement unit.

8. The method of claim 1, wherein the one or more sensors comprises an inertial measurement unit and a video sensor.

9. The method of claim 8, further comprising:

processing a portion of the first pose estimation data set based on at least a portion of the real world scene information captured by the inertial measurement unit and the video sensor.

10. The method of claim 9, further comprising:

receiving a first video frame from the video sensor;

receiving an inertial measurement unit data set from the inertial measurement unit; and predicting the portion of the first pose estimation data set based on the inertial measurement unit data set and the first video frame.

11. The method of claim 1, wherein producing the second pose estimation data set for the user-controlled device comprises:

receiving a user-controlled device data set from one of the one or more user-worn sensors located on a user-controlled device; and producing the second pose estimation data set for the user-controlled device based on the user-controlled device data set and data received from a communicatively connected landmark database.

12. The method of claim 1, wherein producing the second pose estimation data set for the user-controlled device comprises:

estimating a relative orientation between the user and the user-controlled device through the use of at least one user-worn sensor; and producing the second pose estimation data set for the user-controlled device based on the relative orientation and information received from a landmark database.

13. The method of claim 1, wherein the step of producing the pose estimation data set utilizes a landmark database and the real world scene information.

14. The method of claim 1, wherein the captured real world scene information is used to update a landmark database.

15. The method of claim 1, wherein the inter-frame pose information for the at least one camera is predicted by assuming that a movement of the camera occurs at a constant translational velocity and a constant rotational velocity.

16. The method of claim 1, wherein the inter-frame pose information for the at least one camera is predicted by integrating data points to determine an incremental rotational motion between frames captured by the at least one camera.

17. A method of rendering a synthetic object onto a first user-worn display showing a first user's view of a real world scene and the synthetic object onto a second user-worn display showing the second user's view of the real world scene, the method comprising the steps of:

capturing a first set of real world scene information using one or more sensors worn by the first user;

capturing a second set of real world scene information using one or more sensors worn by the second user;

producing a first pose estimation data set and a first depth data set based on at least a portion of the first set of real world scene information, wherein the first pose estimation data set includes predicted inter-frame pose information for at least one camera of the one or more user-worn sensors to compensate for a data capture time lag between the at least one camera and at least one other user-worn sensor of the one or more user-worn sensors;

producing a second pose estimation data set and a second depth data set based on at least a portion of the second set of real world scene information;

receiving the synthetic object generated in accordance with the first pose estimation data set and the first depth data set;

receiving the synthetic object generated in accordance with the second pose estimation data set and the second depth data set;

rendering the synthetic object onto the first user-worn display in accordance with the first pose estimation data set and the first depth data set, thereby integrating the synthetic object into the first user's perception of the real world scene;

rendering the synthetic object onto the second user-worn display in accordance with the second pose estimation data set and the second depth data set, thereby integrating the synthetic object into the second user's perception of the real world scene, wherein the synthetic object appears consistent within the first user's perception of the real world scene and the second user's perception of the real world scene.

18. A system for rendering a synthetic object onto a user-worn display within the user's field of view as the user views real world scene, comprising:

a user-worn computer module configured to:

capture real world scene information using one or more user-worn sensors;

produce a first pose estimation data set and first depth data set based on at least a portion of the real world scene information, wherein the first pose estimation data set includes predicted inter-frame pose information for at least one camera of the one or more user-worn sensors to compensate for a data capture time lag between the at least one camera and at least one other user-worn sensor of the one or more user-worn sensors;

receive the synthetic object generated in accordance with the first pose estimation data set and the first depth data set; and render the synthetic object onto the user-worn display, within the user's field of view as the user views the real world scene, in accordance with the first pose estimation data set and the first depth data set, thereby integrating the synthetic object into the user's view of the real world scene;

a synthetic object computer module configured to:

retrieve the synthetic object from a database in accordance with the first pose estimation data set and the first depth data set;

produce a second pose estimation data set and second depth data set for a user-controlled device;

determine, based at least in part on the first pose estimation data and the second pose estimation data, whether the user-controlled device has interacted with the synthetic object and causing the synthetic object to react to the user-controlled device interaction based at least in part on the first pose estimation data and the second pose estimation data; and transmit the synthetic object to the user-worn computer module.

19. The system of claim 18, wherein the real world information is captured only be the one or more user-worn sensors.

20. The system of claim 18, wherein the one or more user-worn sensors comprises a first video camera and a second video camera in stereo configuration.

21. The system of claim 18, wherein one of the one or more user-worn sensors comprises a LIDAR sensor.

22. The system of claim 18, wherein one of the one or more user-worn sensors comprises an inertial measurement unit.

23. The system of claim 18, wherein one of the one or more user-worn sensors comprises a global positioning system sensor.

24. The system of claim 18, wherein the one or more user-worn sensors comprises an inertial measurement unit and a video sensor.

25. The system of claim 24, wherein the user-worn computer module is further configured to:

produce a portion of the first pose estimation data set based on at least a portion of the real world scene information captured by the inertial measurement unit and the video sensor.

26. The system of claim 25, wherein the user-worn computer module is further configured to:

receive a first video frame from the video sensor;

receive an inertial measurement unit data set from the inertial measurement unit; and predict the portion of the first pose estimation data set base on the inertial measurement unit data set and the first video frame.

27. The system of claim 18, wherein the user-worn computer module is further configured to:

receive a user-controlled device data set from one of the one or more user-worn sensors located on the user-controlled device, and produce the second pose estimation data set for a user-controlled device based on the user-controlled device data set and data received from a communicatively connected landmark database.

28. The system of claim 19, further comprising:

the user-controlled device which includes a marker; and the user-worn computer module is further configured to:

receive a first video frame of the marker from a first video camera, receive a second video frame of the marker from a second video camera, and utilize the first video frame and the second video frame to triangulate a location of the marker, thereby producing the second pose estimation data set for the user-controlled device.

29. The system of claim 28, wherein the user-worn computer module is further configured to:

estimate a relative orientation between the user and the user-controlled device through the use of at least one user-worn sensor, and produce the second pose estimation data set for the user-controlled device based on the relative orientation and information received from a landmark database.

30. The system of claim 18, wherein the user-worn computer module is further configured to produce the first pose estimation data set utilizes a landmark database and the real world scene information.

31. The system of claim 18, wherein the captured real world scene information is used to update a landmark database.

32. The system of claim 18, wherein the user-worn module is further configured to:

prior to rendering the synthetic object, predict the pose estimation data set with latency less than a predetermined threshold using sensors with data capture interval rates greater than the predetermined threshold.

33. A system for rendering a synthetic object onto a first user-worn display showing a first user's view of a real world scene and the synthetic object onto a second user-worn display showing a second user's view of a real world scene, comprising:

a first user-worn computer module configured to:

capture a first set of real world scene information using one or more user-worn sensor;

producing a first pose estimation data set and a first depth data set based on at least a portion of the first set of real world scene information, wherein the first pose estimation data set includes predicted inter-frame pose information for at least one camera of the one or more user-worn sensors to compensate for a data capture time lag between the at least one camera and at least one other user-worn sensor of the one or more user-worn sensors;

receive the synthetic object generated in accordance with the first pose estimation data set and the first depth data set; and render a first embodiment of the synthetic object onto the first user-worn display, in accordance with the first pose estimation data set and the first depth data set, thereby integrating the synthetic object into the first user's view of the real world scene;

a second user-worn computer module configured to:

capture a second set of real world scene information using at least one user-worn sensor;

producing a second pose estimation data set and a second depth data set based on at least a portion of the second set of real world scene information;

receive the synthetic object generated in accordance with the second pose estimation data set and the second depth data set; and render a second embodiment the synthetic object onto the second user-worn display, in accordance with the second pose estimation data set and the second depth data set, thereby integrating the second embodiment of the synthetic object into the second user's view of the real world scene, wherein the synthetic object appears consistent within the first user's perception of the real world scene and the second user's perception of the real world scene;

a synthetic object computer module configured to:

retrieve the first embodiment of the synthetic object and the second embodiment of the synthetic object from a database in accordance with the pose estimation data set and the depth data set;

produce a third pose estimation data set and third depth data set for a first user-controlled device, and produce a fourth pose estimation data set and a fourth depth set for a second user-controlled device, wherein the first user-controlled device is controlled by the first user and the second user-controlled device is controlled by the second user;

and transmit the first embodiment of the synthetic object to the first user-worn computer module and the second embodiment of the synthetic object to the second user-worn computer module;

determining, based at least in part on the first, second, third and fourth pose estimation data sets, whether one or more of the first user-controlled device or and the second user-controlled device has interacted with the first or second embodiment of the synthetic object and causing the synthetic object to react to the user interaction based at least in part on the first, second, third and fourth pose estimation data sets; and providing feedback to the first user and second user corresponding to the user interaction with the first or second embodiment of the synthetic object.

* * * * *